Patented May 2, 1950

2,506,159

UNITED STATES PATENT OFFICE 2,506,159

PRODUCTION OF CHEMICALLY PURE COBALT METAL

Charles L. Mantell, Manhasset, N. Y., assignor to Reduction and Refining Company, Newark, N. J., a corporation of New Jersey No Drawing. Application October 4, 1945, Serial No. 620,398

1 Claim. (Cl. 75—119)

This invention relates to the production of chemically pure cobalt products, particularly cobalt powder. The cobalt now on the market as pure cobalt is not guaranteed to contain more than 98 to 99 per cent of that metal. For many metallurgical uses cobalt powder having a purity of at least 99.9 per cent is in great demand.

Cobalt ores are usually treated so as to produce an impure oxide and this impure oxide may be regarded as the starting point of my process. It usually contains in varying amounts such metals as iron, nickel, copper, manganese, aluminum and calcium and a number of non-metallic elements such as sulphur, phosphorus and silica.

A typical analysis of cobalt oxide is given below:

|  | Per cent |
|---|---|
| Cobalt | 71 |
| Nickel | 0.15 |
| Copper | 0.06 |
| Manganese | 0.16 |
| Iron | 0.25 |
| Aluminum | ? |
| Calcium | 0.5 |
| Sulphur | 0.25 |
| Insolubles (chiefly silica) | 0.35 |

Cobalt products of very high purity have, of course, been prepared in the laboratory for atomic weight determinations and the like. In such cases, however, a high yield was no consideration so that the cobalt salts could be repeatedly re-crystallized or re-precipitated and re-dissolved until a small fraction of the original material has been brought to the desired degree of purity.

Commercially it is not practicable to start with 100 pounds of impure cobalt and end with 5 to 10 pounds of pure cobalt. The principal object, therefore, of the present invention is to provide a process by which high purity and high yield can be obtained simultaneously.

I have found that these desirable objectives can be obtained by a two-stage impurity elimination process, using reagents which are gaseous or readily volatile by heating and which by reaction between themselves or with water will produce readily volatile substances.

The first stage in the process comprises precipitating the bulk of the impurities, leaving the cobalt in solution. The second stage comprises precipitating the cobalt, leaving the remainder of the impurities in solution.

In almost any precipitation there is an entrainment of a small amount of solubles by the precipitate. The total amount entrained depends largely on the total amount of precipitate. As the amount of impurities precipitated in the first stage is small relatively compared with the amount of cobalt, the loss of cobalt entrained is so small that it is not worthwhile to wash the precipitate. In the second stage, however, the situation is quite different. Then the precipitated material has to be washed to remove entrained non-volatile impurities. This washing necessarily causes loss of cobalt. The smaller the amount of material which has to be removed by washing the lower such loss becomes. Since readily volatile impurities are eliminated by subsequent heating of the precipitated cobalt product, it is only the non-volatile impurities which have to be considered in this washing step. By using gaseous or readily volatile reagents exclusively the only non-volatile impurities are those contained in the original impure solution. The most advantageous procedure involves the use, as reagents, of hydrochloric acid, ammonia, ammonium chloride and chlorine.

The fact that the reagents used are gaseous or readily volatile means that they can be obtained commercially in such a high degree of purity that the minute traces of impurities in such reagents are negligible. For example, the iron content of commercial C. P. hydrochloric acid is not more than 0.00003%, that of ammonium chloride not in excess of 0.0005% and that of ammonium is zero. The sulphur contents (as $SO_4$) run about 0.0002% for hydrochloric acid, 0.002% for ammonium chloride and 0.0003% for ammonia. Other impurities such as phosphorus and heavy metals are of the same order of magnitude. Chlorine is also obtainable in a very high state of purity, especially as regards metallic impurities.

The crude oxide is treated with excess of hydrochloric acid to form a solution of cobaltous chloride, $CoCl_2$, with small amounts of the chlorides of the above-mentioned metals and also the sulphates of such metals (and some silicic acid).

The next step is to neutralize the excess hydrochloric acid with ammonia until near the precipitation point of cobalt hydroxide or basic cobalt chloride is reached. Further quantities of ammonia would not only be apt to precipitate cobalt but also to re-dissolve some of the precipitated impurities. For a crude oxide of the composition given above this results in the precipitation of 98% or more of the iron and aluminum and silica, about 75 to 85% of the copper and around 25% of the manganese. This precipitate is filtered off.

The partially purified cobaltous chloride is then converted into cobaltic chloro-pentammine. The first stage involving treatment by ammonia, ammonium chloride and chlorine.

Hydrochloric acid is then added to complete the formation of the chloro-pentammine and precipitate it, leaving the nickel and other impurities in solution. Cobaltic chloro-pentammine is a well known compound. Likewise it is known that its solubility decreases as the hydrochloric acid content of its solution increases. Also it is well known that procedures which form the cobaltic chloro-pentammine do not produce an insoluble nickel compound.

The precipitated ammine is then washed with hydrochloric acid to remove the greater part of the entrained nickel salts and other impurities still in solution.

The crude cobalt oxide is heated with hydrochloric acid in preference to sulphuric acid for various reasons. In the first place the pentammine contains chlorine so that a cobalt salt of any other acid than hydrochloric would have to be converted into cobalt chloride before the ammine could be formed. Second, the use of sulphuric acid would increase the sulphate content of the liquors and thereby also of the final precipitated ammine. In the heat treatment of the ammine or products derived from it any residual sulphate is very apt to be converted into cobalt sulphide—a highly detrimental impurity.

Other alkalies besides ammonia can be used to precipitate iron such as caustic soda, calcium hydroxide, etc., but not as advantageously as ammonia as the resulting sodium or calcium chloride is not volatile like ammonium chloride.

Directly or indirectly the cobalt has to be oxidized by chlorine to bring it from the cobaltous to the cobaltic condition. Where air or hydrogen peroxide is used as the oxidizing agent it reacts with some of the ammonium chloride present to form ammonia, water and chlorine. The latter immediately oxidizes the cobalt ammine to produce the cobaltic pentammine. Chlorine gas had the advantage over air that the oxidation proceeds more rapidly. From the point of view of purity or yield the use of chlorine has no advantage over air or hydrogen peroxide.

Chlorine is given off in the first step of the process in accordance with the following equation:

(1) 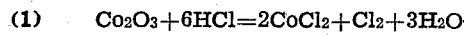
$$Co_2O_3 + 6HCl = 2CoCl_2 + Cl_2 + 3H_2O$$

The same amount of chlorine is required for the production of the ammine.

(2) 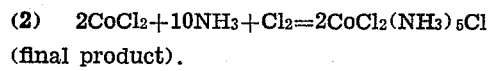
$$2CoCl_2 + 10NH_3 + Cl_2 = 2CoCl_2(NH_3)_5Cl$$

(final product).

Hence the chlorine required from external sources is only that needed to make up losses.

In the solution step, represented by Equation 1 above, the acid should be concentrated to save digestion time. At 20° Bé. solution (31.5% HCl by weight) is satisfactory. Appreciable excess of acid is not required, especially as a part of the chlorine liberated reacts with the water present to form hydrochloric acid.

In a typical mode of carrying out the process 100 lbs. of raw cobalt oxide is digested with 420 lbs. of 20° Bé. acid (the theoretical amount called for by Equation 1) in a glass-lined jacketed vessel with stirring for 3 hours at 75° C. and then for a further 3 hours at 100° C. The chlorine liberated is passed into another vessel containing a previous batch of cobalt chloride and added reagents for oxidation of the cobalt from the cobaltous to the cobaltic condition.

The next step in the process is the precipitation of iron and aluminum and a part of the copper, manganese and other impurities. In this step high cobalt concentrations are to be avoided as tending to increase the liability of cobalt being precipitated along with the impurities, particularly as the solution is cooled prior to such precipitation.

After digestion is completed cold water is run into the jacket of the digestor to cool its contents. At this stage the volume of liquor is slightly under 75 gallons. To the cooled liquor prior to the addition of ammonia to precipitate the iron, etc., cold water is added to bring its volume up to 144 gallons. The concentration of cobalt is, therefore, around 6% at this stage. If the concentration is 15% much cobalt is precipitated before the pH has been raised to the point at which efficient elimination of the impurities is obtained. Ordinarily the cobalt concentration should be under 7.5%.

The pH of the diluted liquor should be greater than 0.5. Large excess of acid should be avoided since the next step is to neutralize almost all of the acid. This is done by adding to the cooled liquor (around 20° C.) dilute ammonia water (1 part by volume 26° Bé. ammonia water plus 4 parts water) with vigorous stirring until the pH has reached 5.6 to 5.7. After standing 3 hours or more (e. g. overnight) a slight further addition of dilute ammonia water with stirring is made to bring the pH to 5.8. After standing an hour or so the insolubles remaining from the acid digestion, chiefly silica and silicates, and the hydroxides and oxychlorides precipitated by the ammonia addition are filtered off.

With quantities of impurities similar to those given in the foregoing analysis the percentages of the amounts originally present which are precipitated by the ammonia are about as follows:

| | Per cent |
|---|---|
| Silica | Over 99.5 |
| Iron | Over 98 |
| Aluminum | Over 98 |
| Copper | 75 to 85 |
| Manganese | 25 |

The filtrate contains cobaltous chloride and a minor percentage of ammonium chloride produced by the neutralization of the hydrochloric acid, plus, of course, small amounts of nickel, manganese and copper, etc., not precipitated by the ammonia. The amount of ammonium chloride so formed should be around 5 lbs. or less. If the amount is greater the quantity of acid used in the digestion was excessive.

Where oxidizing agents other than chlorine are used, such as air or hydrogen peroxide, enough ammonium chloride must be used to supply one additional atom of chlorine for each atom of cobalt. When chlorine is used ammonium is advantageous but not essential. Its chief use is to increase the yield of the desired ammine. Another beneficial function of ammonium chloride is to aid the hydrochloric acid added later in reducing the solubility of the ammine.

I have found a suitable concentration of ammonium chloride in the liquor prior to the addition of the ammonia required for ammine production to be 5 to 6%. Hence, if the liquor contains 5 lbs. as the result of the neutralization of the hydrochloric acid, there should be added a further 70 lbs. to bring the concentration up to 5.5%.

When the ammonium chloride has been dissolved ammonia water is added. The amount is advantageously about 50% in excess of that theoretically required by Equation 2. That means adding 540 lbs. of 26° Bé. ammonia water. Where no ammonium chloride is used the amount of ammonia water should be increased to 675 lbs.

The next step is oxidation of the cobalt to the cobaltic condition by chlorine. The over-all reaction may be represented approximately by Equation 2 given above, although it probably proceeds in stages and is also accompanied to a limited extent by a number of side reactions.

Cobalt chloro-pentammine is fairly soluble in neutral or alkaline solution but can be thrown out of solution nearly completely by adding hydrochloric acid. The ammine becomes less and less soluble as the content of hydrochloric acid increases. There does not appear to be any acid concentration at which the solubility is a minimum. However, the rate of reduction of solubility falls off with increase in acid content so that a practical limit is reached with an acid concentration of around 15% HCl.

This concentration is produced by the addition of 230 gals. of 20° Bé. hydrochloric acid. This is equivalent to 700 lbs. of anhydrous hydrochloric acid. Of these 700 lbs. about 100 is consumed in neutralizing the 50 lbs. excess NH3 (anhydrous) added prior to chlorination to produce 150 lbs. of ammonium chloride, in addition to the 75 lbs. already present.

At this stage the total volume of solution is approximately 460 gallons so that the cobalt content is around 1.6 to 1.7%. It is desirable to keep the cobalt concentration below 2% to reduce the occlusion of impurities by reducing their percentage content in entrained liquor. For example, the removal of calcium sulphate is greater in dilute than in more concentrated solutions. Further, the more concentrated solution the larger the crystals of ammine produced and the greater the difficulty of washing them free of occluded impurities.

Assuming complete precipitation of the 71 lbs. of cobalt in the form of pentammine, the mother liquor then contains approximately

|   | Pounds |
|---|---|
| Hydrochloric acid | 600 |
| Ammonium chloride | 225 |
| Nickel chloride | 0.33 |
| Copper chloride | 0.026 |
| Manganese chloride | 0.23 |
| Calcium chloride | 0.6 |
| Calcium sulphate | 1.0 |

It will be noted therefore that the non-volatile impurities are a very minor percentage of the total non-aqueous content of the mother liquor.

In precipitating the ammine some of the material in solution is unavoidably carried down with the precipitate either by adsorption or by entrainment of mother liquor. Assume that such adsorption or entrainment results in 1/50 of the solubles remaining in the precipitate, even after washing. Reduction of solubles of this order would not lower the ammonium chloride below 4.5 lbs. or 6.3% on the cobalt. However, as the ammonium chloride can be subsequently removed by volatilization, its presence, even in large amounts is immaterial. On the other hand, a similar reduction of nickel, for example, would result in a nickel content of 0.0066 lb. or 0.01% of the cobalt.

The next step is to decant (or filter) then wash the precipitate several times (by decantation and/or washing on the filter). A centrifuge may be used in or after the final wash in order to decrease the amount of adherent liquor. The wash liquors may be hydrochloric acid of various strengths (e. g. 5.0% or greater) and/or ammonium chloride solutions of various strengths (e. g. over 5.0% and preferably 10.0%). The greater the concentration of acid or ammonium chloride, the smaller the loss in yield. Preferably ammonium chloride washes are used exclusively or at most one hydrochloric acid wash followed by ammonium chloride washes. The latter at 10% concentration dissolves an extremely small amount of the cobalt pentammine and is less injurious to equipment and less hazardous to personnel than the hydrochloric acid. It also permits removal of excess acid without large loss of yield obtained when water is employed to remove this excess.

The mother liquor may be placed in a still to drive off the hydrochloric acid for re-use and at the same time raise the concentration of the ammonium chloride to around saturation. The liquor is then withdrawn and allowed to cool to crystallize out the greater part of the ammonium chloride for re-use, either with or without purification by sublimation.

The ammine is then converted into cobalt metal or some other compound of cobalt with the recovery of ammonia and ammonium chloride for re-use in treating subsequent batches of cobalt chloride.

Various methods may be used, one being the reduction of the dry ammine by hydrogen. The end products are probably essentially as represented below:

(3) Co(NH3)5Cl3+heat+H2
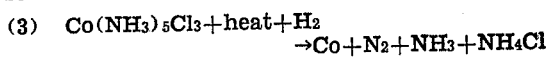

The ammine may be dried by passing warm air at 200 to 220° F. over trays containing the ammine. The dried ammine is then ground and placed in silica boats, which are then placed in a tubular furnace. Hydrogen is passed through the tube and over the boats while the temperature is gradually raised to 1000° F. to decompose the ammine and cause the reduction to cobalt metal. The liberated ammonia and ammonium chloride may be collected for re-use.

It will be noted that not only are all the reagents used in going from the crude oxide to the metal either gaseous or readily vaporizable, but also their products are likewise gaseous or readily vaporizable, which permits their recovery for subsequent use. The chief by-product is ammonium chloride.

The reaction between the excess hydrochloric acid and ammonia in the iron precipitate step produces ammonium chloride. The chlorine also reacts in such a way as to ultimately produce ammonium chloride. The addition of excess hydrochloric acid to the ammoniacal ammine solution likewise forms ammonium chloride. Then, finally, the treatment of the dried ammine with heat treatment and hydrogen yields ammonia and ammonium chloride. As a result, the treatment of each batch yields considerably more ammonium chloride than was added during the course of such treatment. After recovery the excess may be converted into ammonia by the well known procedure of heating the ammonium chloride with lime. Ammonia, being gaseous, is obtained free of lime and the impurities contained in the lime.

What I claim is:

The process of producing substantially chemically pure cobalt metal which comprises treating cobalt oxides with an excess of hydrochloric acid to form a solution of cobaltous chloride; neutralizing the excess acid with dilute ammonia until near the precipitation point of the cobalt salts present and to a pH of about 5.6 to 5.7; allowing the mixture to stand until the precipitation of the bulk of the impurities has been completed, while maintaining a relatively low cobalt concentration of an order not substantially in excess of 7.5%, to prevent losses of cobalt material with the precipitating impurities; making a further slight addition of dilute ammonia water with stirring to bring the pH to approximately 5.8 and permitting the remaining insolubles, comprising silica, silicates, hydroxides and oxychlorides to precipitate; removing the impurities by filtration; and further adding ammonia in molecular proportion to convert the cobalt chloride to the cobalt-chloro-pentammine in the presence of sufficient ammonium chloride for the formation of the compounds; thereafter oxidizing the cobalt chloride in solution in the alkaline filtrate from the foregoing steps to the cobaltic condition by chlorine and maintaining a low concentration of cobalt, not substantially in excess of 2%; thereafter gradually adding hydrochloric acid to effect the precipitation of the pentammine, washing the same for removing adherent impurities, and recovering the metal therefrom.

CHARLES L. MANTELL.

REFERENCES CITED

The following references are of record in the file of this patent:

Prescott & Johnson's "Qualitative Chemical Analysis," 5th ed., p. 161.

Mellor, "Comprehensive Treatise on Inorganic and Theoretical Chemistry," vol. 14, 1935, p. 442.

Treadwell and Hall, "Analytical Chemistry," pp. 188–189, vol. 1, 7th ed. (1930).

Ephraim, "Inorganic Chemistry," 4th ed., 1943, p. 315. P. C. L. Thorne and E. R. Roberts.